US006809761B1

(12) United States Patent
Tamaru (10) Patent No.: US 6,809,761 B1
(45) Date of Patent: Oct. 26, 2004

(54) IMAGE DATA FORMING APPARATUS AND IMAGE DATA PROCESSING METHOD CAPABLE OF RECORDING WITH A WIDE DYNAMIC RANGE

(75) Inventor: Masaya Tamaru, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 918 days.

(21) Appl. No.: 09/599,459

(22) Filed: Jun. 22, 2000

(30) Foreign Application Priority Data

Jun. 22, 1999 (JP) .......................................... 11-175711

(51) Int. Cl.[7] .............................................. H04N 5/235
(52) U.S. Cl. ................................................ 348/229.1
(58) Field of Search ........................ 348/207.99, 218.1, 348/220.1, 221.1, 222.1, 231.99, 231.3, 231.6, 231.7, 254, 294, 296, 297, 239, 229.1, 230.1, 207.2, 333.01; 358/518, 519, 521

(56) References Cited

U.S. PATENT DOCUMENTS

| | | | | |
|---|---|---|---|---|
| 5,386,228 A | * | 1/1995 | Okino ...................... 348/218.1 |
| 5,801,773 A | * | 9/1998 | Ikeda ....................... 348/229.1 |
| 5,828,793 A | * | 10/1998 | Mann ......................... 382/284 |
| 5,914,748 A | * | 6/1999 | Parulski et al. ............. 348/239 |
| 6,040,858 A | * | 3/2000 | Ikeda ......................... 348/242 |
| 6,480,226 B1 | * | 11/2002 | Takahashi et al. .......... 348/296 |

FOREIGN PATENT DOCUMENTS

JP          A7131718          5/1995

* cited by examiner

Primary Examiner—Tuan Ho
(74) Attorney, Agent, or Firm—Birch, Stewart, Kolasch & Birch, LLP (57) ABSTRACT

The image data forming apparatus and an image data processing method for recording image data on an image data recording medium in a wide dynamic range and reproducing a finished image from the image data. The apparatus separates a wide dynamic range image signal of an image, generated from a solid-state imaging device, into main data M suitable for forming the finished image and highlight data H having a higher range with the use of a range separator, associates the main data M with the highlight data H, and records them in an image recording memory. At this time, a main data processor performs gradation control and compression on the main data M. A highlight data processor performs gradation control and compression on the highlight data H as necessary. An image reproducer reads out the main data M and the highlight data H, associated with each other as one image, from the image recording memory and develops them on a common axis Q for composition. This restores the original dynamic range image signal and allows the image to be reproduced on a printer. From the main data M, the image is displayed on a video monitor as the finished image.

31 Claims, 6 Drawing Sheets

IMAGE DATA FORMING APPARATUS AND IMAGE DATA PROCESSING METHOD CAPABLE OF RECORDING WITH A WIDE DYNAMIC RANGE

BACKGROUND OF THE INVENTION

1. Field of the Invention

The present invention relates to an image data forming apparatus, and, more particularly, to an image data forming apparatus such as a digital electronic still camera for recording an image signal produced from a solid-state imaging device such as a charge-coupled device, and also to an image data processing method.

2. Description of the Background Art

In general, a solid-state imaging device, such as a charge-coupled device (CCD), has its dynamic range much narrower than the latitude of a silver-halide photosensitive type of negative film. However, recent advances in the semiconductor manufacturing technology and the wide dynamic range image sensor technology, such as multiple-exposure shooting, have made available a wider dynamic range solid-state imaging device.

Nevertheless, when recorded on an image data recording medium or reproduced on a video monitor, the dynamic range of image data generated by such a wide dynamic range solid-state imaging device must be compressed to a range prescribed by a certain standard. Take the video signal compatible with the NTSC standard television system for example. When the video or image signal is reproduced into visible images for display on a monitor, the dynamic range has to be compressed to the signal characteristics of as narrow as 100IRE. This requires gradation control, for example, by giving a knee curve to the gradation characteristics. In addition, when image data is processed in the form of digital data, each pixel of image data is, in general, dealt with in the form of eight bits per channel. Therefore, the dynamic range of image data generated by a solid-state imaging device has to be compressed to this range through gradation control.

In many cases, the NTSC signal and digital signal data are reproduced basically for the purpose of viewing on a video monitor. This means that, when compressing the dynamic range of image signals obtained from a solid-state imaging device, with a reproduction system in which the brightness and the tint appropriate for a picture are already fixed, gradation control is performed such as to produce a "finished image", which requires the reproduction system not to make a significant modification but a fine adjustment only. In other words, a conventional image capturing/recording system, which is adapted to record an image signal obtained from a solid-state imaging device, performs most signal processings before recording and records the image signal in the form of a finished or complete image.

From another viewpoint, however, this recording system, adapted to record a finished image, is required to record image data in a form capable of reproducing a picture satisfactory for viewing. This, in turn, requires the image sensor system to perform sophisticated automatic exposure control and automatic white balance control. However, it is not easy to adequately record in a recording dynamic range so restricted as described above a scene, e.g. against the light or in an excess amount of light, which involves a broader dynamic range and in addition a difficulty in calculating an appropriate control value for the automatic exposure control. In addition, because the image data of a finished image is compressed when recorded, the finished image, if unsatisfactory, is difficult to correct.

For example, when a finished image reproduced from digital image data recorded on a recording medium is a little bit over-exposed in its entirety, it is sometimes desired to correct the image toward its under-exposure. It is however not possible to restore highlight data, or part of the image data which has high intensity and was once removed when compressed to a prescribed size, e.g. 8 bits, of recording dynamic range. On such image data, a gradation correction made in the 8-bit dynamic range would give a corrected image whose white part is dimmed or contrast is excessively enhanced.

On the other hand, a large amount of data may be recorded on a silver-halide photosensitive type negative film that has a remarkably wider dynamic range. A print system reproducing a visible image from a silver-halide photosensitive type negative film utilizes this feature of wider dynamic range for printing to correct the image so as to extract only a range of the data appropriate for printing. More specifically, a silver-halide photosensitive type negative film is basically intended to record as much information as possible on a negative film, or a recording medium, so that, when being printed, information only for satisfying the requirements is cut out by correcting the image to form an appropriate finished image. This method is best suited to get an appropriate final image. However, since a silver-halide photosensitive type negative film is so far an intermediate medium, images recorded on a silver-halide negative film cannot be viewed nor therefore used as a finished image.

The ability to record digital image data with a dynamic range as wide as that of a silver-halide photosensitive type negative film and, from this image data, to form and print a finished image, if available, would be very efficient for producing an appropriate final image. However, recording image data with a wide dynamic range and reproducing a finished image from that image data are, in general, incompatible.

Figure 2:
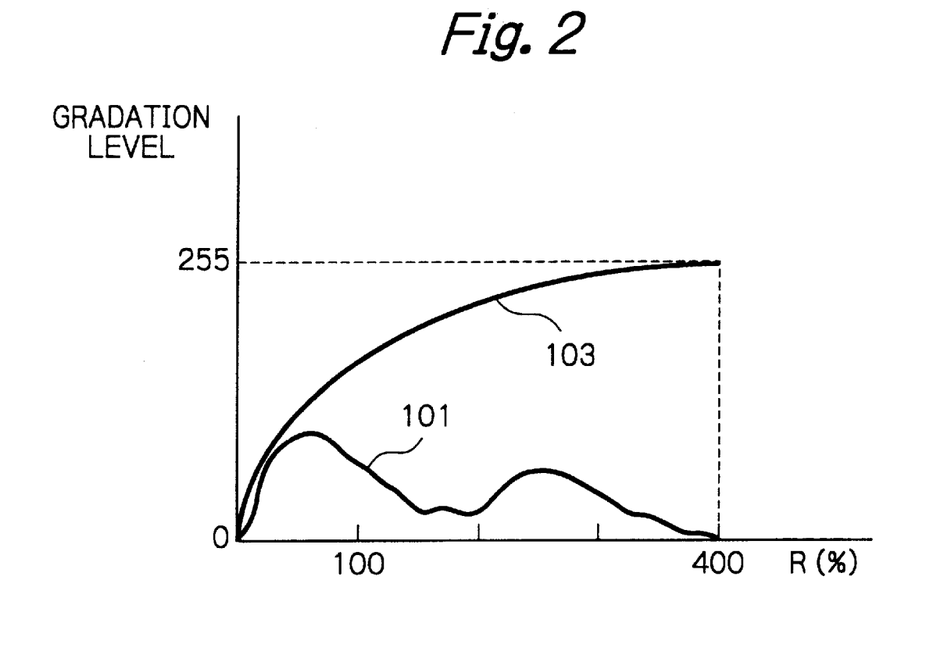
FIG. 2 is a graph showing an example of an intensity distribution and gradation control characteristics of a picture.

For example, assume that there is established an image sensor system with a wide dynamic range capable of covering up to 400% of relative reflectivity (R), or a relative brightness against a gray plate, of a certain part of an objective field. In an imaging system where the imagewise signal from the image sensor system is converted to 8-bit image data for recording onto an image data recording medium, gradation control is performed, when the imagewise signal is converted to eight-bit image data, on the signal which is developed from the imaging sensor system and linear to the amount of light incident to the sensor system. For example, as shown in FIG. 2, the image data of a scene taken against light is distributed as plotted by a curve 101 with much image data in a higher relative reflectivity area. More specifically, for a scene including much highlight data as such, effective data may be recorded up to almost the maximum gradation level "255" represented by eight bits. The gradation control curve therefor is plotted as indicated by a reference numeral 103.

Figure 3:
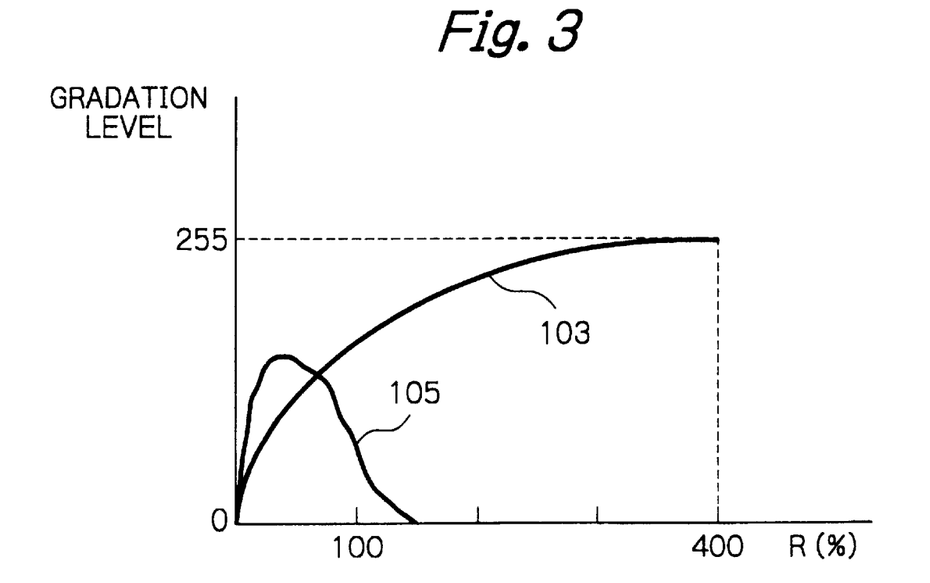
FIG. 3 is a graph, like FIG. 2, showing another example of an intensity distribution and gradation control characteristics of a picture.

On the other hand, the gradation of the image data of a scene taken in the for light or in the shade is plotted as indicated by a reference numeral 105 in FIG. 3, with more image data in areas with a lower relative reflectivity. Therefore, performing gradation control for a scene with less highlight data in the eight-bit gradation range makes it difficult to use the entire range efficiently. In addition, because the relative reflectivity of a main object, such as a man or woman, is generally 100% or lower, the application of the same gradation control curve 103 would produce as a whole a dark image that is not practically viewed.

Japanese patent laid-open publication No. 131718/1995 discloses an image composing apparatus that shoots one scene in different exposure amounts in a single shooting operation and then composes the data of the thus obtained plurality of images to form a picture of wider dynamic range. More specifically, this image composing apparatus combines two types of image data: one is standard image data shot with a standard exposure and the other is non-standard image data shot with a non-standard exposure, for example, using a high-speed shuttering. The image composing circuit of the apparatus is adapted to determine from both images the common areas whose intensity level falls in a predetermined range and then shift the intensity levels of the common areas so as to match with each other. The circuit in turn replaces the areas of the non-standard image which have the intensity level falling in the predetermined range for the areas of the standard image which correspond to the former areas of the non-standard image and have the intensity outside the predetermined range. By doing so, white- or black-filled areas in one image are replaced with the corresponding areas in the other. This known image composing apparatus is configured so that the data of two different images may be generated by shooting the same scene, each with its own exposure.

This known image composing apparatus teaches us how to form a finished image using wide dynamic range image data. When the user wants to correct the finished image by himself or herself or during reproduction on the subsequent reproducing apparatus, the composing apparatus requires the finished image per se to be corrected. In other words, regardless of the fact that wide dynamic range image data has been captured by the imaging system, part of the image data which is not involved in the finished image cannot be used at a later time.

SUMMARY OF THE INVENTION

It is therefore an object of the present invention to provide an image data forming apparatus and an image data processing method capable of recording image data with a wide dynamic range onto an image data recording medium and reproducing a finished image from the thus recorded image data.

The image data forming apparatus according to the present invention comprises an input circuit for receiving a first image signal forming an image; a range separator connected to the input circuit for separating the first image signal into a second and a third image signal, the second image signal corresponding to a first range of a dynamic range which the first image signal has and being suitable for forming a finished image of the first image signal, the third image signal corresponding at least to a second range other than the first range; and an output circuit connected to the range separator for associating the second image signal with the third image signal as the image and outputting the second and third image signals.

Preferably, the output circuit may comprise a recording memory for recording therein the second image signal and the third image signal.

The input circuit may preferably comprise a solid-state imaging device for imaging a subject field as the image and generating, as the first image signal, the image signal representing the subject field.

According to the present invention, the image reproducer comprises an input circuit for receiving a first image signal corresponding to a first range suitable for forming a finished image of an image and a second image signal corresponding at least to a second range other than the first range, the first and second image signals being associated with each other as the image; a range combiner connected to the receiving circuit for developing and combining the first and second image signals on a common axis and for generating a third image signal having a dynamic range including the first and second ranges; and an image output circuit for reproducing the image from the third image signal.

Preferably, the receiving circuit may comprise a recording memory recording therein the first and second image signals associated with each other; and a reading circuit reading out the first and second image signals associated with each other as the image from the recording memory.

According to the present invention, the image data processing method comprises the steps of receiving a first image signal forming an image; separating the first image signal into a second and a third image signal, the second image signal corresponding to a first range of a dynamic range which the first image signal has and being suitable for forming a finished image of the first image signal, the third image signal corresponding at least to a second range other than the first range; and associating the second image signal with the third image signal as the image and outputting the second and third image signals.

Preferably, the image data processing method may further comprise the step of recording the second and third image signals associated with each other and output on a recording medium.

The image data processing method may further comprise the steps of reading out the second and third signals associated with each other as the image from the recording medium; developing and combining the second and third image signals read out on a common axis and forming the first image signal having the dynamic range; and reproducing the image from the first image signal formed.

The image data processing method may further comprise the steps of reading out the second image signal from the recording medium; and visualizing the image in a form of finished image from the second image signal read.

In this way, the finished image may be formed and recorded from wide dynamic range image data. At the same time, image data not used for forming the finished image is recorded so as to enable a reproducer system to efficiently utilize those data.

In this specification, the term "a wide dynamic range imaging device" refers to an imaging device with several kinds of photosensitive cells which are different in sensitivity from each other.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
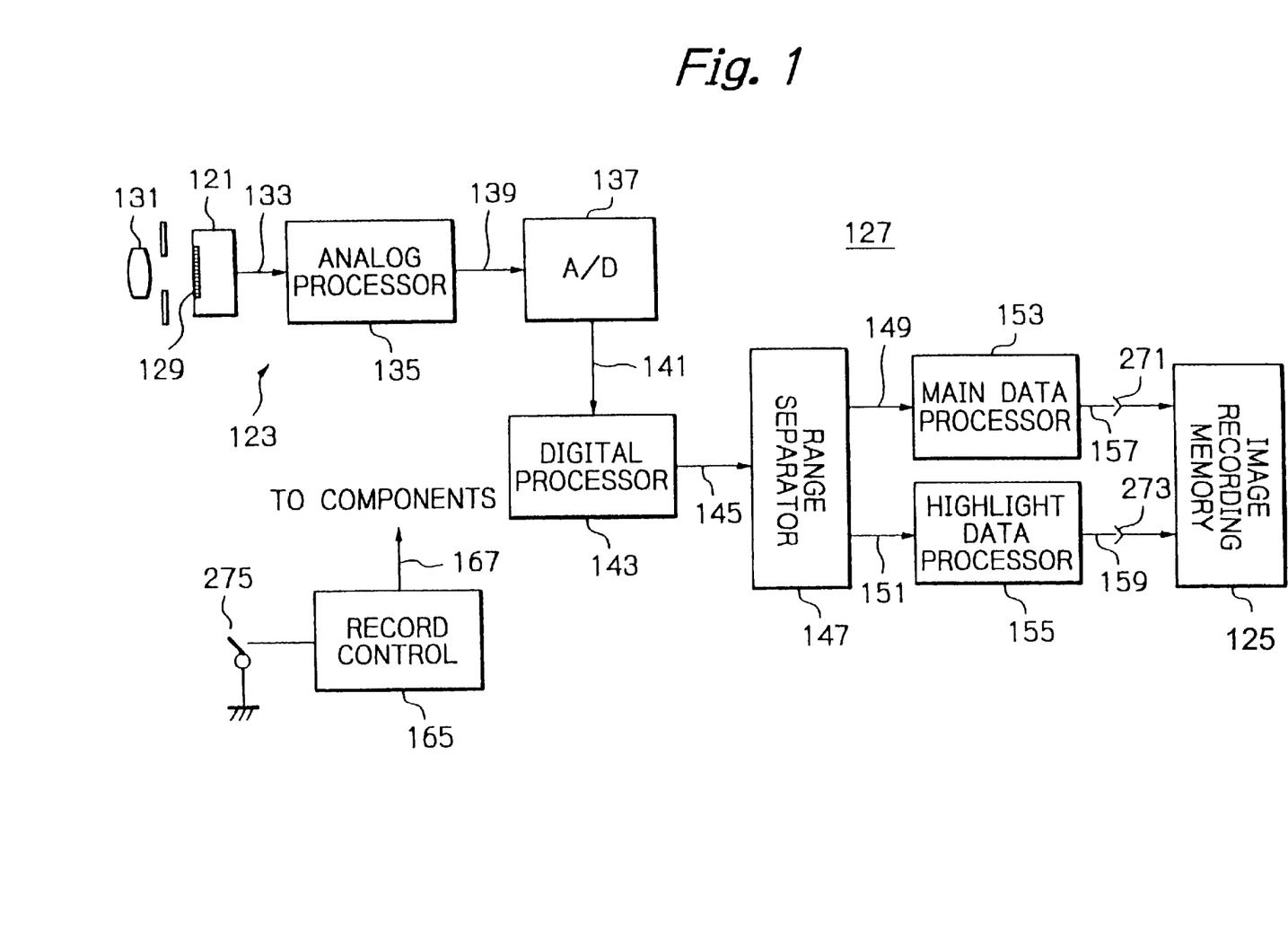
FIG. 1 is a schematic block diagram showing an embodiment of an image data forming apparatus in accordance with the present invention.

With reference to the accompanying drawings, an embodiment of an image data forming apparatus according to the present invention will be described in detail. Referring to FIG. 1, the embodiment of the image data forming apparatus according to the present invention is a digital electronic still camera 127 adapted to control the gradation of an image signal, representative of a subject field shot by an image sensor system 123 including a solid-state imaging device 121, in a wide dynamic range and store the image signal in an image recording memory 125, such as a memory card, in the form of digital image data.

The image sensor system 123 has an imaging lens 131 that focuses a subject field image onto a photosensitive cell array 129 of the solid-state imaging device 121. The solid-state imaging device 121 is a charge-coupled device (CCD), for example, adapted to develop a color image signal, corresponding to the subject field image focused on the photosensitive cell array 129, on its output 133. The output 133 is connected to the input of an analog processor 135. In the following description, signals are designated by the reference numerals of the corresponding connection lines on which they appear.

The analog processor 135 is an analog processing functional unit that is adapted to adjust the gain and the white balance of the image signal input to its input 133. The image sensor system 123 comprises all components from the lens 131 to the analog processor 135. The analog processor 135 has its output 139 connected to the input of an analog-digital (A/D) converter 137. The latitude of the image signal that is sent from the image sensor system 123 to the output 139 of the analog processor 135 determines the dynamic range of the image sensor system 123. This embodiment advantageously utilizes a wide dynamic range charge-coupled device, for example, a charge-coupled device with approximately 400% of relative reflectivity (R), as well as the analog processor 135, to attain a dynamic range wider than that of a conventional electronic still camera. Of course, it is understood that the solid-state imaging device 121 may be of a high definition pixel or mega-pixel density.

The A/D converter 137 is adapted to receive the image signal on its input 139 and convert it to 10 bits of digital image data with this embodiment. Of course, the apparatus according to the present invention is not limited to a particular number of bits. Ten bits of image data are used here only for illustration. The A/D converter 137 outputs converted data on its output 141 which is connected to the input of a digital processor 143.

The digital processor 143 performs signal 10 processing such as color interpolation, offset adjustment, and gain control. On the input 141 of the digital processor 143, R/G/B color signals are incoming which correspond to the segment array of a color filter, not shown, of the solid-state imaging device 121. The digital processor 143 interpolates the signal of a color that is not provided in the segment array of the color filter to produce a resultant signal composed of the R/G/B color signal for each predetermined number of pixels on its output 145. The output 145 of the digital processor 143 is connected to a range separator 147.

Figure 4:
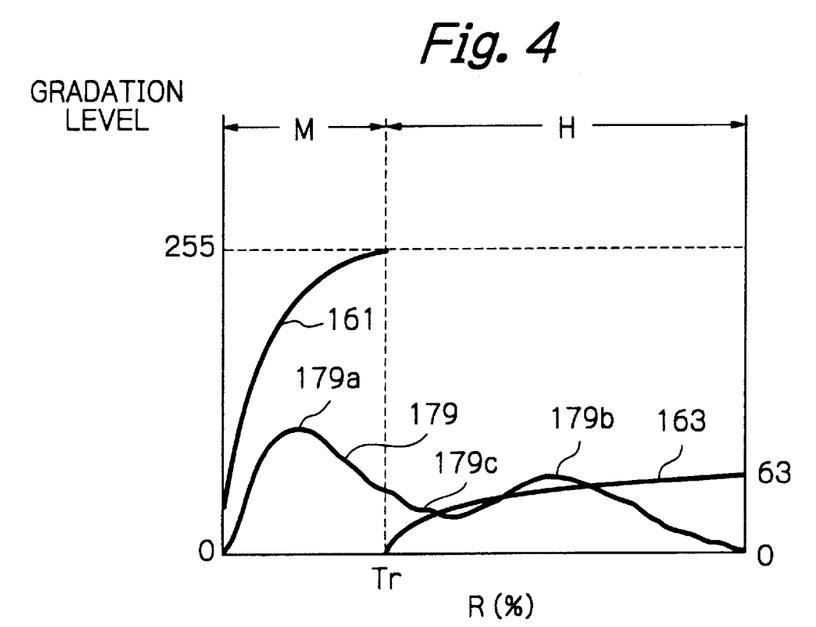
FIG. 4 is a graph, like FIG. 2, useful for understanding how image data is separated into main data and highlight data in the embodiment shown in FIG. 1.

For each color signal R/G/B received on the input 145, the range separator 147 in this embodiment separates 10 bits of the data into two ranges of image data: one is lower-intensity image data, i.e. eight-bit main data M, FIG. 4, for forming a finished image, and the other is higher-intensity image data, i.e. six-bit highlight data H, FIG. 4. This separator will be described later in detail.

The range separator 147 has two outputs 149 and 151. The main data M is output on one output 149, and highlight data H on the other output 151. The output 149 is connected to the input of a main data processor 153, and the output 151 to the input of a highlight data processor 155. The main data processor 153 and the highlight data processor 155 are image data processors that perform various types of processings, such as gradation control, signal processing and compression, on the main data M and the highlight data H, according to the respective data characteristics. The main data processor 153 has an output 157, while the highlight data processor 155 has an output 159 connected to the image recording memory 125.

As described above, the illustrative embodiment includes the range separator 147 adapted to separate the image data for which color interpolation has been done by the digital processor 143 for the signal composed of the R/G/B signal for each predetermined number of pixels. However, it should be noted that the present invention is not limited to this particular configuration. Instead, the signal from the output 141 of the A/D converter 137, for which color interpolation is not yet performed, may be connected directly to the range separator 147 for range separation. After that, signal processings, such as color interpolation, may be performed for each of the main data M and the highlight data H.

The image recording memory 125 is adapted to store therein image data in the rewritable mode. This is, for example, a semiconductor storage device such as a memory card. In FIG. 1, as the marks designated by the reference numerals 271 and 273 represent symbolically, the image recording memory 125 in this embodiment is removably connected to the image data forming apparatus 127. Of course, the present invention is not limited to this particular type of memory but may be applied to other types of recording media such as a magnetic or optical disc in which image data may be stored or a semiconductor memory which is permanently connected.

The image data forming apparatus 127 in this embodiment has a record control 165, which is a main controller that integrally controls the above-described components in response to a shutter release button 275 of the image data forming apparatus 127. The record control 165 controls in a wide dynamic range the gradation of the image signal produced by the solid-state imaging device 121, the separation of the signal into two ranges, M and H, and record of the signal into the image recording memory 125 in the form of digital image data. Although the record control 165 is connected to the components of this apparatus, a single connection line 167 in FIG. 1 symbolically indicates those connections to the components to prevent the figure from being confused.

In this embodiment, the wide dynamic range image data, obtained from the image sensor system 123, is separated into at least two ranges, M and H, and then recorded in the image recording memory 125. As shown in FIG. 4, those two ranges are low-intensity main data M and high-intensity highlight data H which are separated by a predetermined threshold Tr of relative reflectivity (R). The main data processor 153 controls the gradation of the main data M in such a manner that the main data per se forms a finished image. An example of this gradation control is represented by a curve 161. In addition, the highlight data H may be gradation-controlled as necessary. An example of the latter gradation control is plotted on a curve 163. Two types of image data, M and H, which are range-separated and gradation-controlled as necessary, are stored in separate memory locations in the memory 125 associated with that image.

Figure 5:
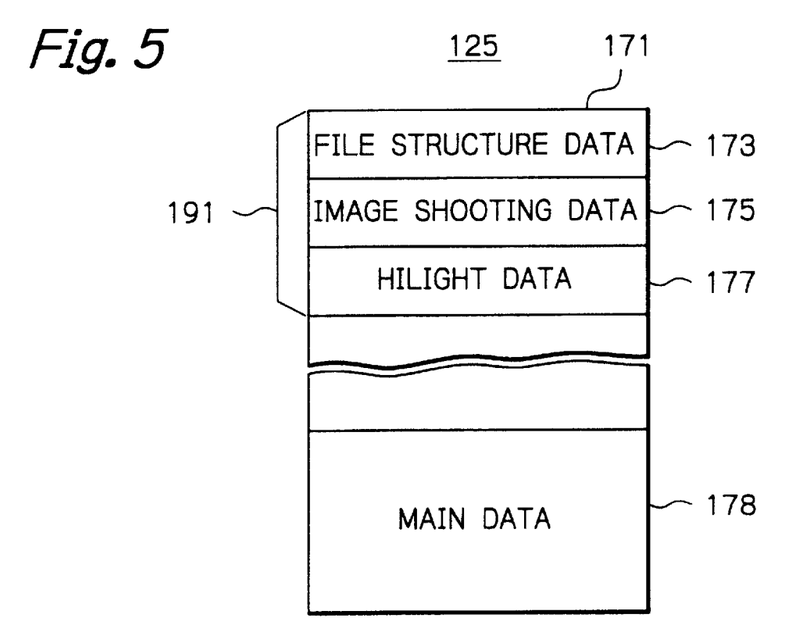
FIG. 5 shows an example of the configuration of an image data file in the embodiment.

FIG. 5 shows an example of the configuration of a data entry 171 of one image, or a scene, stored in the image recording memory 125. The data entry 171 of an image comprises a file structure data field 173 defining the file structure, an image shooting data field 175 containing data concerning image shooting such as scene shooting conditions and image data compression conditions, a highlight data field 177 containing highlight data H, and a main data field 178 containing main data M. The file structure data field 173, the image shooting data field 175, and the highlight data field 177 constitute the management area in the beginning of the file, or a header 191. It is apparent, from the above description, that the main data M and the highlight data H, though stored separately in the image recording memory 125 as described above, need not necessarily be stored in separate data files. Rather, they may be stored in separate memory locations (addresses) of the same data file.

The range separator 147 need not be adapted to separate the image data always into two ranges as described above but may separate the image data into three or more ranges. For example, with two thresholds Tr1 and Tr2 established, the image data may be separated into three. They are shadow data in an area with the relative reflectivity equal to or lower than the lower threshold Tr1, main data in an area with the relative reflectivity between two thresholds Tr1 and Tr2, and highlight data in an area with the relative reflectivity equal to or higher than the higher threshold Tr2. In any case, the image data of at least one appropriate central area on the relative reflectivity axis is used as an area for forming a finished image.

Data, such as highlight data, included in an image data range not necessary for forming a finished image may be compressed by the associated data processor 153 or 155 in dependent upon the characteristics of the image data in that range. For example, as shown in an exemplified shot scene in FIG. 6, highlight data H is not usually distributed throughout an entire subject field 181 but, in many cases, is localized in a particular section 183. In such a case, another area 185 includes only main data. Thus, in this embodiment, the highlight data processor 155 functions as performing spatial compression, such as run-length coding, on the entire image area 181.

The ranges M and H need not be definitely separated by thresholds Tr but the image data may overlap to some extent. For example, the main data may comprise image data with the relative reflectivity threshold equal to or lower than 150% and the highlight data may comprise image data with relative reflectivity equal to or higher than 140%. Neither does the threshold Tr have to be constant. The threshold may be variable depending upon e.g. the nature of the image signal received from the image sensor system 123. For example, the digital processor 143 may be adapted to plot a histogram of the entered image data 141 and analyze its distribution so that, if there are two peaks 179a and 179b in the gradation level of the relative reflectivity R as exemplified by the curve 179, FIG. 4, the threshold Tr may be set around a trough 179c between the two peaks.

Returning now to FIG. 1, the maximum value of image data sent to the range separator 147 depends on the performance of the A/D converter 137. In this embodiment, the A/D converter 137 converts analog data to 10-bit digital data with the maximum value "1023". This maximum value corresponds to the maximum value of the image signal 139 output from the image sensor system 123, that is, the maximum value of the dynamic range of the image signal. Because 400% of relative reflectivity is defined as the maximum of the dynamic range of the output signal 139 in the image sensor system 123 in this embodiment, the A/D converter 137 assigns the 400% of relative reflectivity to the level "1023". In this case, assume that the threshold Tr used by the range separator 147 is set to 120%. As understood from FIG. 7, since the digital data 141 of the image signal is linear to the relative reflectivity R, the value Tq of the digital data corresponding to the threshold Tr of the relative reflectivity R is equal to "307". More specifically, the value Tq of digital data corresponding to the threshold Tr of the relative reflectivity R is set up to a value to which the maximum output level of the A/D converter 137 is interpolated by the ratio of the threshold Tr of the relative reflectivity R to the maximum value of the relative reflectivity in the image sensor system 123. This digital value Tq is used for composing main data M with highlight data H when reproducing the image at a later time. For tat aim in this embodiment, this value Tq is stored, for example, in the image shooting data field 175 of the data file 171.

The range separator 147 separates the image data of the R/G/B color into two ranges according to the threshold Tq that is set as described above. The main data processor 153 and the highlight data processor 155 control the gradation of the main data M and the highlight data H of the R/G/B color, respectively, and then compress them.

The main data processor 153 gradation-controls the main data received on the input 149. This gradation control is based on the control curve 161, FIG. 4, corresponding to the inverse function of the gamma characteristics of a monitor 293 to allow a useful finished image to be viewed on the image display 293, FIG. 8, such as a video monitor in the reproduction system. At this time, the image data is converted also to the image data recording format. For example, when recorded in an eight-bit image data format, the main data is converted to an eight-bit data format, ranging from 0 to 255 in digital value, when controlled in gradation. The main data processor 153 converts the R/G/B color signal data in this data format to the luminance/color-difference (Y/C) signal and compresses the resultant, converted signal. The compressed luminance/color-difference signal is sent from the output 157 of the main data processor 153 to the image recording memory 125 and then written into the field 178, FIG. 5, of the image file 171 associated with the image. The data format of this main data may be the conventional format. As will be detailed later, the main data is composed or combined with the highlight data H to reproduce print data. Therefore, the main data is recorded in the image recording memory 125 in associated with the corresponding highlight data H. This maintains compatibility with the existing image data file system in which only the image data of a finished image is recorded.

It is desirable that the gradation control curve 161 used in gradation control in the main data processor 153 be recorded in part of the header 191 of the image file 171, for example, in the image shooting data field 175, in the form of a table or a function defining the curve 161.

The highlight data processor 155 assigns the quantization level to the highlight data H received from the range separator 147 on its input 151. This level assignment may be linear, or may alternatively be based on the gradation control curve 163, FIG. 4, in which finer levels, and hence more bits, are assigned to lower intensities. In that case also, as done with the main data M, a table or a function which defines the gradation control curve 163 and has been used in the gradation control is recorded in the header 191 of the image file 171 for later use in reproduction.

In this embodiment, the R/G/B image signal of 10 bits per pixel per channel output from the A/D converter 137 is gradation-controlled and compressed to eight-bit Y/C main data 157 by the main data processor 153 and to six-bit Y/C highlight data 159 by the highlight data processor 155. As shown in FIG. 4, six bits per pixel per channel are assigned to the highlight data H, whose relative reflectivity R ranges from the threshold Tr to 400%, with the result that the highlight data H is converted to digital values ranging from 0 to 63. As more bits are assigned to the highlight data H, less loss is found in the highlight data and so the connection between the gradation levels becomes smoother.

The coded image data is interpreted as described below. Assume that the digital value Tq corresponding to threshold Tr is "512". In this case, if the data value of pixel p1 of a channel is less than "512", for example "340", then the value of only the main data M is "340" and the value of the highlight data H is a null. Conversely, if the data value of pixel p2 is "512" or higher, for example "650", the data is determined as the highlight data H. The value of the main data M is "511", and the value of the highlight data H is the difference of the value of that pixel from the threshold "512", that is, "138". In this way, the main data M falls in the range 0–511, and the highlight data does also in the range 0–511. In this embodiment, the original 10-bit data is thus divided by the threshold Tq into the main data M and the highlight data H with an additional bit indicating whether the data is the main data M or the highlight data H. The value of the main data M is quantized by eight bits, while the value of the highlight data H is quantized by six bits. In the above example, the data of pixel p1 is represented by the binary value "0", which indicates the main data M, and the data value "340". Also, the data of pixel p2 is represented by the binary value "1", which indicates the highlight data H, and the data value "138".

Figure 6:
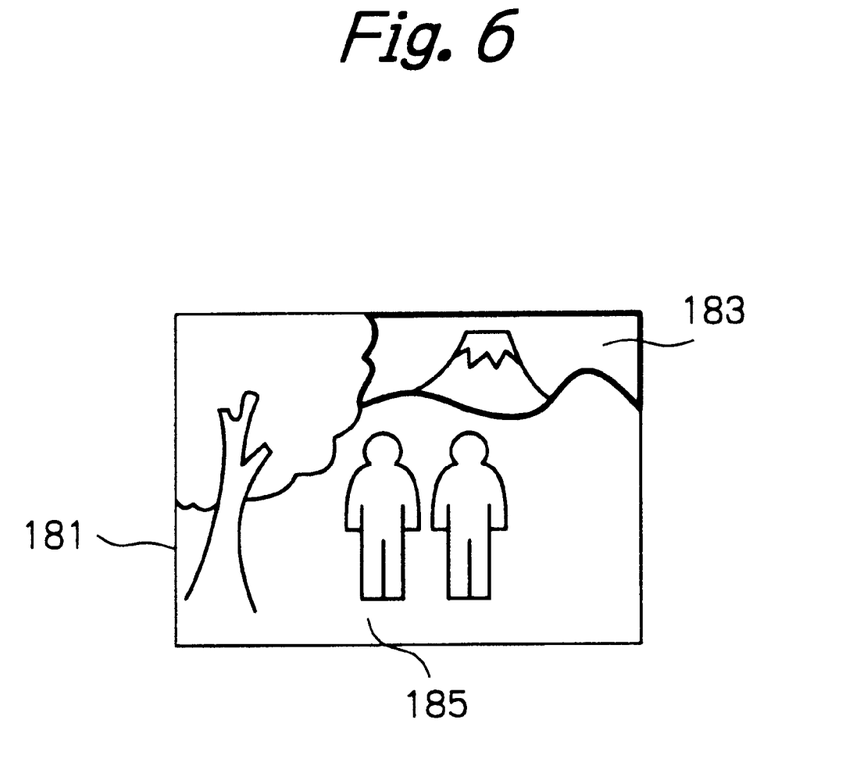
FIG. 6 is a plan view showing an example of a picture including the main data and the highlight data.

As exemplarily shown in FIG. 6, the ratio of the highlight section 183 to the whole picture area 181 is, in general, low and, therefore, there are a small number of pixels in the section. This means that, in a usual scene, many of the pixels include the value of highlight data being zero. Thus, a way of compressing the highlight data H may be selected independently of a way of compressing the main data M, but the most efficient way can be selected only by taking account of the nature of the highlight data H. For example, the run length coding may advantageously be selected in an area where there is a succession of zeros.

In the image recording memory 125, the highlight data 177 and the main data 178 may be in the same file or in separate files. In either case, the correspondence between both data has to be defined for a single image. When they are recorded in separate files, the highlight data H is recorded, for example, in a part, such as the field 177, of the header 191. Also, the highlight data H may be recorded in the footer of the file, a data field, not shown, following the code indicating the end of the image file at the end portion of the image file. The footer field may often be ignored by most file systems. However, the system may be adapted in such a manner that the data format to be stored in the footer field is defined and used accordingly. The gradation control curve 161 and the table or the function defining the curve 163, which are described above, may also be recorded in the footer. In this specification, the special fields in an image file, such as the header or the footer, are called "management area".

Depressing the shutter release button 275 of the digital still camera 127 in its operative state causes the record control 165 to control the components of the apparatus. The record control 165 drives the solid-state imaging device 121 to shoot the subject field. The color image signal 133 from the solid-state imaging device 121 is sent to the analog processor 135 for adjusting the gain and the white balance. In this embodiment, the image signal that is output from the output 139 of the analog processor 135 has a wide dynamic range of about 400% of relative reflectivity (R). The A/D converter 137 converts the image signal on its input 139 to the corresponding 10-bit digital image data and sends the converted, resultant data to the digital processor 143.

The digital processor 143 performs color interpolation, offset adjustment, and gain control on the image data received on its input 141 and outputs the signal, including R/G/B signal, from the output 145 for each specified number of pixels. The range separator 147 receives the 10-bit color signal data R/G/B on its input 145 and separates it into two ranges of image data: 8-bit main data M and the 6-bit highlight data H. After the range separation, the main data M is sent to the main data processor 153, and the highlight data H to the highlight data processor 155. The main data processor 153 performs gradation control, signal processing, Y/C signal conversion and compression on the main data M according to the data characteristics, and stores the resulting data into the image recording memory 125. The highlight data processor 155 performs gradation control, signal processing and compression on the highlight data H according to the data characteristics, and stores it into the image recording memory 125 with the highlight data H associated with the main data M.

In this way, wide dynamic range image data, obtained from the image sensor system 123, is separated by the range separator 147 into at least two ranges of image data, M and H, with a predetermined threshold Tr of the relative reflectivity (R) as the boundary. The two ranges of separated image data, associated with each other, is recorded into the image recording memory 125. At this time, the main data processor 153 performs gradation control 161 on the main data M such that the main data M alone can form a finished image.

The highlight data processor 155 performs gradation control 163 on the highlight data H as necessary and the spatial compression on the data H.

Figure 8:
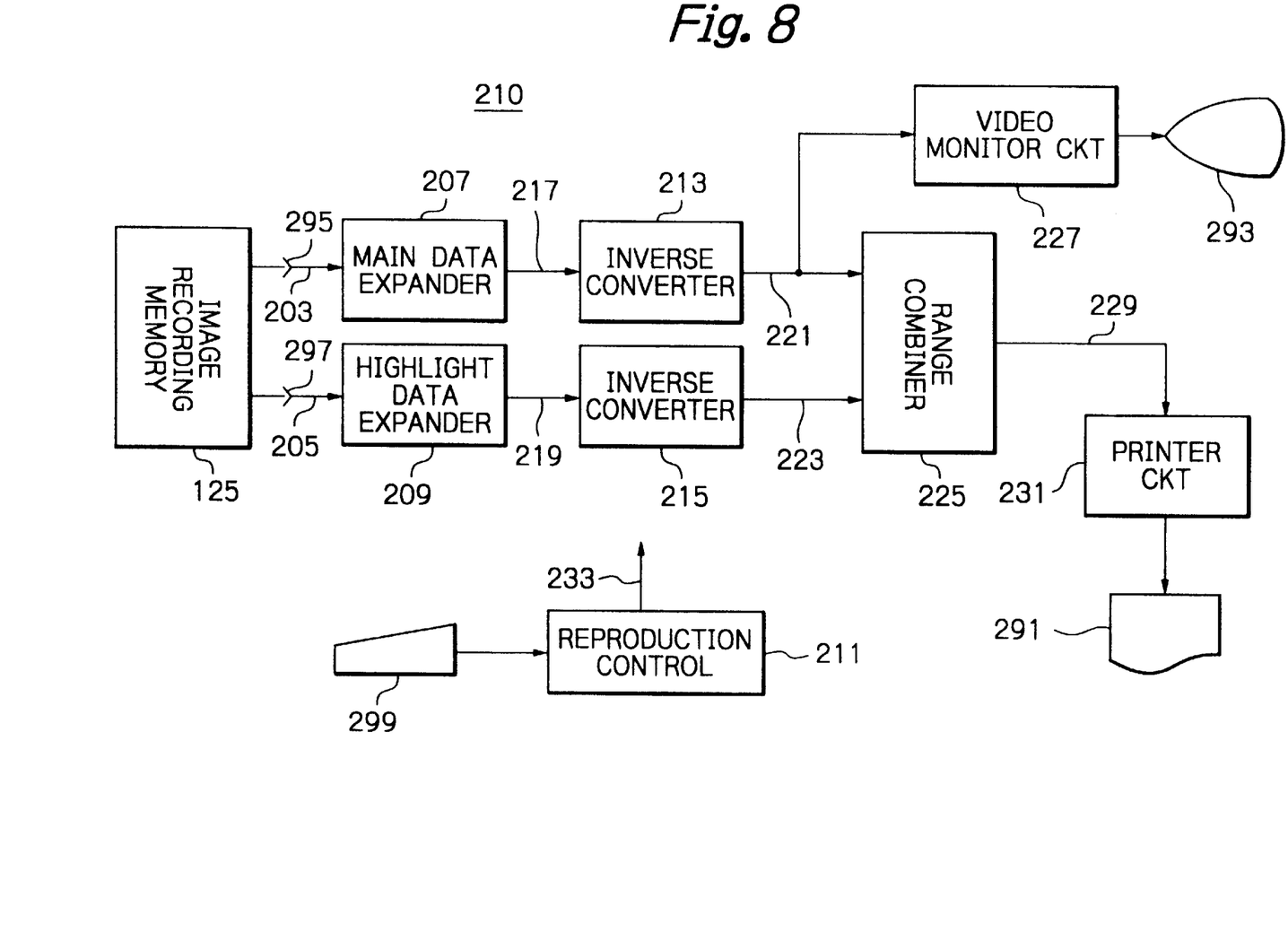
FIG. 8 is a schematic block diagram showing an example of an image reproducer which combines the main data and the highlight data recorded by the image data forming apparatus shown in FIG. 1 to reproduce a picture.

The image data recorded in the image recording memory 125 as described above is reproduced in this embodiment by an image reproducer 201 structured as shown in FIG. 8. For printing an image from the image data formed by a plurality of ranges thus divided, the image data in these ranges are composed or combined with each other. The image reproducer 201 is adapted to read out the image data of one image from the image recording memory 125, reproduce the visual image on a video monitor 293, and print it on a printer 291. This image reproducer 201 is adapted to once restore the plurality of ranges of data on the same axis and then compose them.

With the relative reflectivity taken as the composition axis, such inverse-conversion of the main data M, which inversely corresponds to the gradation control 161 performed on the main data M, allows the image data of the main data M to be restored on the relative reflectivity axis. Also, in an application in which a gradation control has been performed on the highlight data H, such inverse-conversion of the highlight data H, which inversely corresponds to the gradation control performed on the highlight data H, allows the image data of the highlight data H to be restored on the relative reflectivity axis. Restoring the ranges of image data back onto one and the same axis, which is the relative reflectivity axis in this example, and thereafter composing them allow the image data to be restored back to the form of the image signal before recorded in the image recording memory 125, for example, back to the wide dynamic range image data of the image signal 139 output from the image sensor system 123. To correct the brightness of the wide dynamic range image data that has been restored, a desired part included in the dynamic range may be cut out, and image processing such as gradation control may be performed on it. The image reproducer 201 in this embodiment functions as reproducing the image thus outlined above.

Referring now to FIG. 8, the image recording memory 125 has a pair of outputs, 203 and 205, connected to a main data expander 207 and a highlight data expander 209, respectively. As described above, the image recording memory 125, a semiconductor memory such as a memory card, is detachably connected to the image reproducer 201 via the connectors indicated conceptually by the marks with reference numerals 295 and 297. Of course, the present invention is not limited to this particular type of memory.

The main data expander 207 and the highlight data expander 209 are memory read out and expander/decoder circuits that are adapted to read out and expand the main data M and the highlight data H of one image, respectively, from the image recording memory 125. As described above, the image recording memory 125 stores therein gradation-controlled, compressed and coded image data, each image composed of the main data M and the highlight data H that are associated with each other. The main data expander 207 and the highlight data expander 209 read the file 171 of one image under the control of a reproduction control 211 that will be described later. Both expanders 207 and 209 expand the image data back into the original form according to the gradation control characteristic data recorded in the shooting data field 175. In this embodiment, both the main data M and the highlight data H are recorded in the image recording memory 125 in the format of the Y/C signal. Therefore, the main data expander 207 and the highlight data expander 209 serve as converting the data to the R/G/B signal. The main data expander 207 and the highlight data expander 209 have outputs 217 and 219 connected to a pair of inverse converters 213 and 215, respectively.

The one inverse converter 213 is adapted to inversely convert the main data M composed of the R/G/B signal which has been expanded by the main data expander 207. This circuit 213 performs inverse conversion as follows. First, the circuit 213 checks the table or function data included in the image shooting data field 175 read out from the image recording memory 125 and identifies the gradation control 161, FIG. 4, that was performed on the main data M recorded in the memory 125. Then, the circuit 213 produces an inverse function Im, FIG. 7, to which the gradation control 161 thus identified inversely corresponds. The inverse conversion will be accomplished on the basis of the inverse function Im thus produced. In this embodiment, the main data M, represented by the 8-bit gradation level, takes digital values from 0 to 255. Therefore, as plotted in FIG. 7, the main data is inversely converted to the linear values defined by Q=Im(M) in the range from the value "0" to the value Tq corresponding to the threshold Tr of the relative reflectivity R. The inverse converter 213 of the main data M outputs this value Q from its output 221.

Similarly, the other inverse converter 215 is adapted to inversely convert the highlight data H composed of the R/G/B signal which has been expanded by the highlight data expander 209. This circuit 215 performs inverse conversion as follows. First, the circuit 215 checks the data included in the shooting data field 175 read out from the image recording memory 125 and identifies the gradation control 163, FIG. 4, that was performed on the highlight data H recorded in the memory 125. Then, the circuit 215 generates an inverse function Ih to which the gradation control 163 thus identified inversely corresponds. The inverse conversion will be performed on the basis of the inverse function Ih thus produced. In this embodiment, the highlight data H, represented by the 6-bit gradation level, takes digital values from 0 to 63. Therefore, as understood from FIG. 7, the main data is inversely converted to the linear values defined by Q=Ih (H) in the range from the value of 0 to the value (1023-Tq) The inverse converter 215 of the highlight data H outputs this value Q from its output 223. The outputs 221 and 223 of the two inverse converters 213 and 215 are connected to the respective inputs to a range combiner 225.

As described above, the main data M can form a finished image by itself. Therefore, in this embodiment, the output 221 of the inverse converter 213 of the main data M is connected also to a video monitor circuit 227. The video monitor circuit 227 is a video reproduction circuit that converts the image signal, obtained from the output 221, to the corresponding analog signal for reproduction on the monitor display 293 in the form of visual image.

Figure 7:
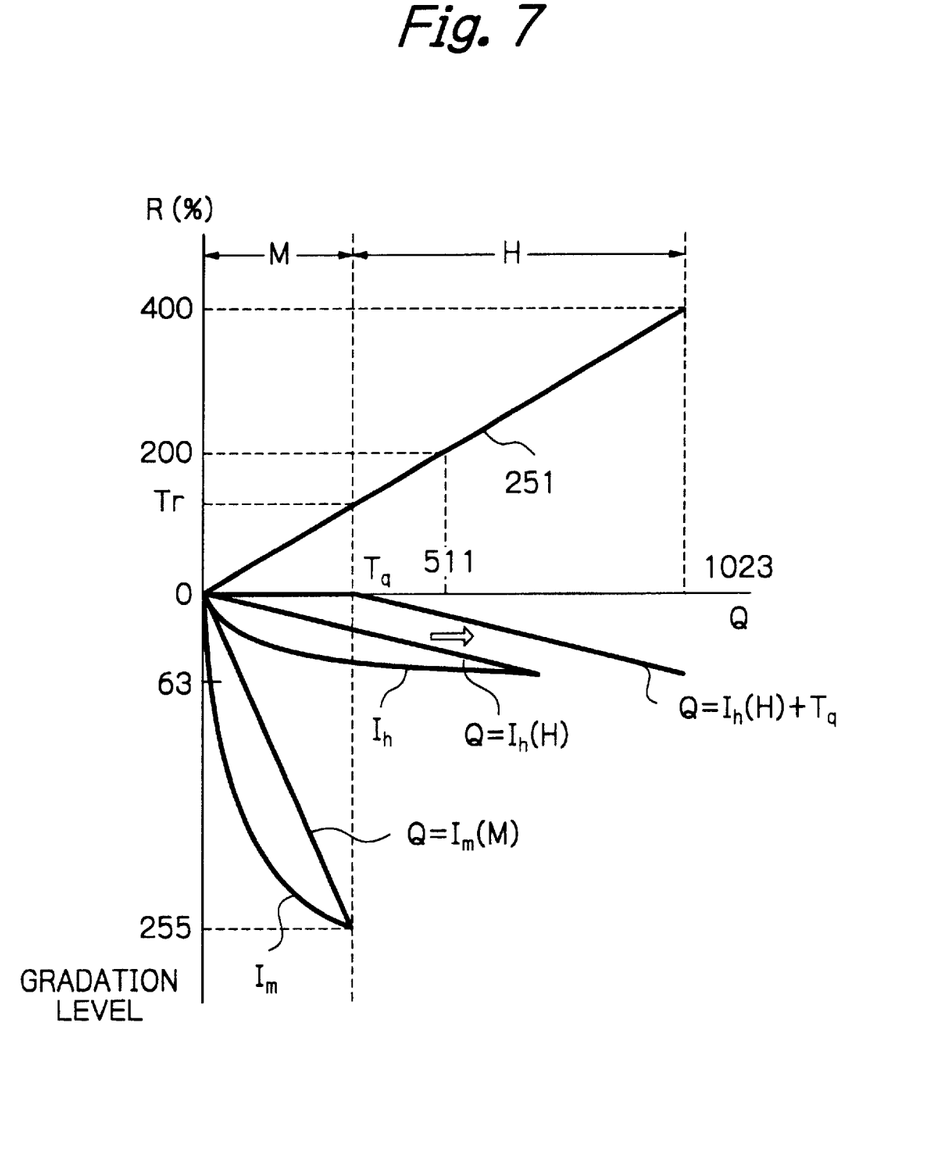
FIG. 7 is a chart useful for understanding how to combine image data composed of the main data and the highlight data.

The range combiner 225 is adapted to develop on the composition axis Q the inversely-converted values Q of the main data M and the highlight data H received on its inputs 221 and 223 in the form of the R/G/B signal and then add up the developed values. To add up the values, the combiner shifts the inversely-converted values defined by Q=Ih(H) of the highlight data H by the value Tq corresponding to the threshold Tr, as depicted in FIG. 7, to obtain Q=Ih(H)+Tq. Those inversely-converted values are combined with the inversely-converted values Q=Im (M) of the main data M. This operation gives the linear, combined data 251 which takes values from 0 to 1023 on the composition axis Q. As shown in the figure, the image data 251 on the composition axis Q is main data M in the range 0 to Tq, and the highlight data H in the range Tq–1023. These values are linear with respect to the relative reflectivity R. This data is equivalent to the image data that appeared prior to the range separator 147 in the image data forming apparatus 127, in other words, the wide dynamic range image signal output from the image sensor system 123.

The range combiner 225 has its output 229 from which the image data combined as described above is output. In this embodiment, this output is connected to a printer circuit 231. The printer circuit 231 is an image signal reproduction circuit that reproduces and prints the image signal from the output 229 of the range combiner 225 onto a printer 291 in the form of visual image.

The reproduction control 211 integrally controls the components of the image reproducer 201 in response to the operation performed by an operator on an operation unit 299. The reproduction control 211 reads out the image data of a picture from the image recording memory 125 and causes the video monitor circuit 227 to reproduce, and/or the printer circuit 231 to print, its visual image. To execute this function, the reproduction control 211 is connected to the components of this apparatus, although in FIG. 8, a single connection line 233 symbolically indicates those connections to the components to prevent the figure from being confused.

In operation, the image recording memory 125 in which image data has been recorded by the image data forming apparatus 127 is installed on the image reproducer 201 for reproduction. In response to an instruction from the operation unit 299 to print a desired image, the reproduction control 211 reads out the image data of a picture associated with the instruction from the image recording memory 125 and reproduces its visual image on the video monitor 293, and/or prints it on the printer 291. The reproduction control 211 reads out the main data M and the highlight data H into the main data expander 207 and the highlight data expander 209, respectively, via a pair of outputs 203 and 205 of the image recording memory 125.

The main and highlight data expanders 207 and 209 expand the main and highlight data M and H, respectively, of the file 171 of an image read out from the image recording memory 125. As described above, the image recording memory 125 stores therein gradation-controlled, compressed and coded image data, each image composed of the main data M and the highlight data H that are associated with each other. The main and highlight data expanders 207 and 209 identify the gradation control characteristic data recorded in the shooting data field 175 of the file 171 of the image. Based on the characteristic data, those expanders expand the image data, restore the expanded data to the state that was taken before expanded, and convert the Y/C signal of the main data M and the highlight data H back to the format of the R/G/B signal. The R/G/B signal converted from the Y/C signal of the main data M and the highlight data H are input to the pair of inverse converters 213 and 215.

The one inverse converter 213 checks the table or function data included in the shooting data field 175 to identify the gradation control 161 that was performed on the main data M recorded in the image recording memory 125, generates the inverse function Im, and inversely converts the main data M of the R/G/B signal according to the inverse function Im. The main data M inversely converted in this manner is output from the output 221 to one of the inputs of the range combiner 225 and to the video monitor circuit 227. The video monitor circuit 227 converts the received image signal to the corresponding analog signal for reproduction on the video monitor 293 in the form of finished image.

The other inverse converter 215 checks the data included in the shooting data field 175 to identify the gradation control 163 performed on the highlight data H recorded in the image recording memory 125 and produces an inverse function Ih. The converter 215 in turn inversely converts the highlight data H of the R/G/B signal according to the produced inverse function. The highlight data H thus inversely converted is output from the output 223 to the other input of the range combiner 225.

On the other hand, the range combiner 225 adds up, on the composition axis Q, the inversely converted values Q of the main data M and the highlight data H received on the inputs 221 and 223. Then, the combiner 225 develops the values into linear, combined data 251 that takes values in the range 0–1023 on the composition axis Q. This restores the data to the wide dynamic range image signal output from the image sensor system 123 of the image data forming apparatus 127. The range combiner 225 outputs the image data thus combined to the output 229. The printer circuit 231 will in turn send the image data to the printer 291 for printing or reproducing in the form of visual image.

The brightness of a reproduced image is adjusted by multiplying the combined data 229 (Q) by a coefficient in the printer circuit 231. For example, for −1EV correction, that is, to make the reproduced image darker one level, the value of the Q data 251 is multiplied by ½. In addition, when reproducing the image on the printer 291, part of the Q data may be cut out appropriately for the recording (printing) range of the reproduction system in the printer circuit 231. For example, when using print paper with the recording range of up to R=200% of relative reflectivity, the range of values 0–511 on the composition axis Q is cut out to be printed on the paper, as understood from FIG. 7. At that time, based on the gradation characteristics of the reproduction system, gradation control is performed on the range thus cut out.

When viewing an image on the video monitor 293, the image reproducer 201 in the embodiment uses only the main data M and visualizes it for display as a finished image. When printing on paper, the image reproducer 201 composes a plurality of ranges of image data, M and H, to make an appropriate correction dependent upon the conditions of a recording medium used and/or the conditions of the image shot for reproducing an image with an appropriate brightness.

As described above, the image data forming apparatus according to the present invention has the following advantages while still maintaining compatibility with existing image files. The apparatus uses only main data M for forming a finished image when viewing an image on a video monitor. On the other hand, the apparatus uses both main data M and highlight data H for correction processing and appropriate image reproduction as necessary when processing an image or when reproducing an image on paper. In other words, from wide dynamic range image data, the apparatus not only forms and records a finished image but also records image data not used for the finished image so that a reproducer system can efficiently utilizes those data.

The entire disclosure of Japanese patent application No. 175711/1999 filed on Jun. 22, 1999 including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An image data forming apparatus comprising:
an input circuit for receiving a first image signal forming an image;
a range separator connected to said receiving circuit for separating the first image signal into a second and a third image signal, the second image signal corresponding to a first range of a dynamic range which the first image signal has and being suitable for forming a finished image of the first image signal, the third image signal corresponding at least to a second range other than the first range; and an output circuit connected to said range separator for associating the second image signal with the third image signal as the image and outputting the second and third image signals.

2. The apparatus according to claim 1 wherein said output circuit comprises a first processor for controlling a gradation of the second image signal.

3. The apparatus according to claim 2 wherein said first processor compresses and encodes the second image signal gradation-controlled.

4. The apparatus according to claim 2 wherein said output circuit further comprises a second processor for controlling a gradation of the third image signal.

5. The apparatus according to claim 4 wherein said second processor compresses and encodes the third image signal gradation-controlled.

6. The apparatus according to claim 2 wherein said output circuit further comprises a second processor for compressing and encoding the third image signal.

7. The apparatus according to claim 1 wherein said output circuit comprises a recording memory for recording therein the second image signal and the third image signal.

8. The apparatus according to claim 1 wherein said receiving circuit comprises a solid-state imaging device for imaging a subject field as the image and generating an image signal representing the subject field as the first image signal.

9. The apparatus according to claim 8 wherein said input circuit further comprises a signal processor for processing the first image signal according to characteristics of said solid-state imaging device.

10. The apparatus according to claim 8 wherein said input circuit further comprises a signal converter for converting the first image signal to digital data and developing the digital data to said range separator.

11. The apparatus according to claim 8 wherein said solid-state imaging device generates the first image signal in a wide dynamic range.

12. The apparatus according to claim 6 wherein said output circuit comprises a recording memory for recording therein the second and third image signals,
said first and second processors each recording the second and third image signals in said recording memory as a common file.

13. The apparatus according to claim 12 wherein said second processor records the third image signal in a management area in said file.

14. The apparatus according to claim 12 wherein said recording memory includes a memory card, said output circuit comprising a connector for removably connecting the memory card to said first and second processors.

15. The apparatus according to claim 1 wherein said input circuit analyzes distribution of an intensity of the first image signal and, if there is a trough in the distribution, sets a threshold corresponding to the trough in said range separator, said range separator separating the range into the first and second ranges with the trough as a boundary.

16. An image reproducer comprising:

an input circuit for receiving a first image signal corresponding to a first range suitable for forming a finished image of an image and a second image signal corresponding at least to a second range other than the first range with the first and second image signals associated with each other as the image;

a range combiner connected to said input circuit for developing and combining the first and second image signals on a common axis and for generating a third image signal having a dynamic range including the first and second ranges; and an image output circuit for reproducing the image from the third image signal, wherein the first image signal is a gradation-controlled signal, said receiving circuit comprising a first processor for inversely converting a gradation of the first image signal.

17. The image reproducer according to claim 16 wherein the first image signal is a compressed and coded signal, said first processor expanding the first image signal.

18. The image reproducer according to claim 16 wherein the second image signal is a gradation-controlled signal, said input circuit further comprising a second processor for inversely converting a gradation of the second image signal.

19. The image reproducer according to claim 18 wherein the second image signal is a compressed and coded signal, said second processor expanding the second image signal.

20. The image reproducer according to claim 16 wherein said input circuit comprises:

a recording memory for recording therein the first and second image signals associated with each other; and a reading circuit reading out the first and second image signals from said recording memory, the first and second image signals being associated with each other as the image.

21. The image reproducer according to claim 16 further comprising a video display for receiving the first image signal and visualizing the image in the form of a finished image.

22. The image reproducer according to claim 16, wherein said image output circuit comprises a printer for receiving the third image signal and printing thereon the image.

23. The image reproducer according to claim 22 wherein said image output circuit cuts out a desired part of the dynamic range, and performs gradation control on the part cut out based on gradation characteristics of said printer.

24. An image recording system comprising:

an input circuit for receiving a first image signal forming an image;

a range separator connected to said input circuit for separating the first image signal into a second image signal and a third image signal, the second image signal corresponding to a first range of a dynamic range which the first image signal has and being suitable for forming a finished image of the first image signal, the third image signal corresponding at least to a second range other than the first range;

a recording memory connected to said range separator for associating the second image signal with the third image signal as the image and recording therein the second and third image signals;

a reading circuit reading out the second and third image signals associated with each other as the image from said recording memory;

a range combiner connected to said reading circuit for developing and combining the second and third image signals on a common axis and for forming the first image signal having the dynamic range; and an image output circuit connected to said range combiner for reproducing the image from the first image signal formed.

25. The system according to claim 24, further comprising a video display connected to said reading circuit for receiving the second image signal and visualizing the image in a form of finished image.

26. A method of processing image data comprising the steps of:

receiving a first image signal forming an image;

separating the first image signal into a second and a third image signal, the second image signal corresponding to a first range of a dynamic range which the first image signal has and being suitable for forming a finished image of the first image signal, the third image signal corresponding at least to a second range other than the first range; and associating the second image signal with the third image signal as the image and outputting the second and third image signals.

27. The method according to claim 26, further comprising the step of recording the second and third image signals associated and output on a recording medium.

28. The method according to claim 27, further comprising the steps of:

reading out the second and third signals from the recording medium associated with each other as the image;

developing and combining the second and third image signals read out on a common axis and forming the first image signal having the dynamic range; and reproducing the image from the first image signal formed.

29. The method according to claim 27, further comprising the steps of:

reading out the second image signal from the recording medium; and visualizing the image in a form of finished image from the second image signal read out.

30. An image reproducer comprising:

an input circuit for receiving a first image signal corresponding to a first range suitable for forming a finished image of an image and a second image signal corresponding at least to a second range other than the first range with the first and second image signals associated with each other as the image;

a range combiner connected to said input circuit for developing and combining the first and second image signals on a common axis and for generating a third image signal having a dynamic range including the first and second ranges;

an image output circuit for reproducing the image from the third image signal, and a video display for receiving the first image signal and visualizing the image in the form of finished image.

31. An image reproducer comprising:

an input circuit for receiving a first image signal corresponding to a first range suitable for forming a finished image of an image and a second image signal corresponding at least to a second range other than the first range with the first and second image signals associated with each other as the image;

a range combiner connected to said input circuit for developing and combining the first and second image signals on a common axis and for generating a third image signal having a dynamic range including the first and second ranges; and an image output circuit for reproducing the image from the third image signal, wherein said image output circuit comprises a printer for receiving the third image signal and printing thereon the image, and wherein said image output circuit cuts out a desired part of the dynamic range, and performs gradation control on the part cut out based on gradation characteristics of said printer.

* * * * *